United States Patent [19]

Petersen et al.

[11] 4,426,697
[45] Jan. 17, 1984

[54] BUS SYSTEM WITH ADDRESS AND STATUS CONDUCTORS

[75] Inventors: Hans Petersen, Fürth-Burgfarrnbach; Kurt Stegmann, Nuremberg, both of Fed. Rep. of Germany

[73] Assignees: Diehl GmbH & Co., Nuremberg, Fed. Rep. of Germany

[21] Appl. No.: 276,915

[22] Filed: Jun. 24, 1981

[30] Foreign Application Priority Data

Jun. 26, 1980 [DE] Fed. Rep. of Germany ....... 3023880
May 7, 1981 [DE] Fed. Rep. of Germany ....... 3117983

[51] Int. Cl.³ .................................................. H04J 6/00
[52] U.S. Cl. ........................................ 370/85; 370/92; 340/825.07; 340/825.52
[58] Field of Search .................. 370/85, 91, 92, 67, 370/86; 340/825.05, 825.06, 825.07, 825.08, 825.52

[56] References Cited

U.S. PATENT DOCUMENTS

| 3,911,218 | 10/1975 | Suzuki et al. | 370/85 |
| 3,963,870 | 6/1976 | Couder et al. | 370/85 |
| 4,229,792 | 10/1980 | Jensen et al. | 370/85 |
| 4,241,444 | 12/1980 | Kister | 370/85 |
| 4,242,749 | 12/1980 | Takezoe | 370/85 |
| 4,290,134 | 9/1981 | Hampshire | 370/85 |

*Primary Examiner*—Douglas W. Olms
*Attorney, Agent, or Firm*—Scully, Scott, Murphy & Presser

[57] ABSTRACT

A bus system with an address conductor and a status conductor onto which there are connected mutually parallel stations with programmable address decoders and with status decoders and/or status encoders, whereby the address conductor carries a sequence of address informations and the status conductor status informations timewise associated therewith. The bus system is essentially so constructed whereby the address conductor carries mutually spaced serially binary coded bit patterns of presently m address bits (address-bit pattern m), and the status conductor which is displaced relative to the address-bit pattern carries a serial bit pattern of r status bits (status-bit pattern r).

11 Claims, 5 Drawing Figures

BUS SYSTEM WITH ADDRESS AND STATUS CONDUCTORS

BACKGROUND OF THE INVENTION

1. Field of the Invention

The present invention relates to a bus system with an address conductor and a status conductor onto which there are connected mutually parallel stations with programmable address decoders and with status decoders and/or status encoders, whereby the address conductor carries a sequence of address informations and the status conductor status information timewise associated therewith.

2. The Prior Art

A bus system of this type is known from German Laid-open Patent Application 26 44 106.

SUMMARY OF THE INVENTION

In contrast with the prior art, the present application has as its object to so modify a bus system of similar type in a context that, while maintaining a high degree of freedom from interference, it opens capabilities for a decisive reduction in access times, at least with respect to the status information transmissions between some of the connected stations, and concurrently is imparted a further increase in the freedom from interference.

The foregoing object is inventively achieved in a bus system of the above mentioned type, in that it is essentially so constructed whereby the address conductor carries mutually spaced serially binary coded bit patterns of presently m address bits (address-bit pattern m), and the status conductor which is displaced relative to the address-bit pattern carries a serial bit pattern or r status bits (status-bit pattern r).

The present invention distinguishes itself through satisfactory service conditions since the address bit pattern and status bit pattern appear clearly displaced relative to each other. This service compatibility is of great significance, especially in critical instances of application, such as on board an aircraft.

It is suitable that the beginning of the decoding of the status bit pattern be conducted out of the address-readiness bit pattern whereby, advantageously, merely the status coding is controlled when addressed; in effect, a status-bit pattern can concurrently contain informations and addressed call up answer-back signals associated with all stations.

Connecting ahead of the address-bit pattern a constant identically recurring readiness bit pattern, opens particularly simple circuitry capabilities for the internal automatic control of the address decoding and, as occasioned, for the initiation of the address-associated status decoding.

It is of particular advantage, when a sufficiently lengthy waiting time span with L-potential follows the address bit pattern, in which to the beginning of the status-bit pattern there can be positioned the functionally most important and thereby the status informations which must be necessarily decoded free of interference. Moreover, there then exists the possibility that the status-bit pattern also be extended up into the readiness-bit pattern ahead of the subsequently following address-bit pattern, since there is then present on the address conductor a constant HIGH (H) potential, thus in any case, no switching sequences will occur which can influence the status decoding.

In the series-parallel conversion for the decoding of the status information the address information, advantageously follows under the automatically-controlling cooperation of the readiness-bit pattern ahead of each address-bit or status-bit pattern. The lead bit, just at the beginning of an address and a status information, controls the termination of the series-parallel conversion for the decoding, so that decoding requirements (and decoding time) can be saved, in that, for example, the station decoder, coming into consideration with the volume of the status information, will have associated only predetermined ranges in connection to the status-readiness pattern.

There is obviated any requirement for the status encoding in the respective transmitter station and the status decoding in those stations in which this status information is to be signaled; and there is also obviated the requirement for technologically complex circuitry and information processing time for the status differentiation when in individual stations which are addressed through the address conductor there are present a plurality of status transmitters; when through the cyclical addressing there are not controlled stations (for the receipt of their status informations), but the address transmitted cyclically through the address conductor are directly associated with individual status transmitters (or as occasioned defined transmitter groups), without distinguishing during the addressing in which stations there are arranged these transmitters.

Insofar as there can be proceeded from the point that the status informations are merely binary informations, the status transmitter address in the instance of activated status transmitters are simply connected through as status information on the status conductor, in essence, the bus system, in the case of an existing predetermined status report, carries, somewhat displaced in time with respect to the status transmitter address, just this address once again as status information on the status conductor. This will provide the result that for a status encoding there is no longer required any kind of complex circuitry (except for the through-connection of the already present address), and for the status decoding for status signal transmission there can be employed the identical decoding circuit such as for address decoding for the purpose of calling an individual status transmitter.

Since the total number of all cyclically addressable status transmitters are spatially divided among different stations, for the further reduction in requirements it is purposeful that the standardized decoding and encoding switching networks thus be equipped for decoding capability of collective possible addresses, but only, in comparison thereto, of a considerably much lower number of bistable switch elements for transmitter interrogation within such switching networks.

The activation of signal transmitters associated with predetermined status transmitters is suitably effected through a bistable switch element which is set back first at a later point in time within the address cycle. In order not to require therefore any additional information within the address-information sequence, and to design the resetting cycles constant in the interest of clear signalling as independently as possible from the position from the actual address within the address cycle it, is purposeful to simply decode an address for the resetting of the signal transmitter switch elements located ahead of the pertinent address; for which there can again be utilized the actual standardized series-parallel decoding circuit.

BRIEF DESCRIPTION OF THE DRAWINGS

Further features and advantages of the invention may be ascertained from the following detailed description of the exemplary embodiments, as illustrated in the drawings which are restricted to the essentials, whereby in the interest of clarity for the entirety of all bits there is presently selected one bit pattern, as well as for the number of the bits within a bit pattern there is always selected the same reference letter.

As shown in the drawings

DETAILED DESCRIPTION

Figure 1:
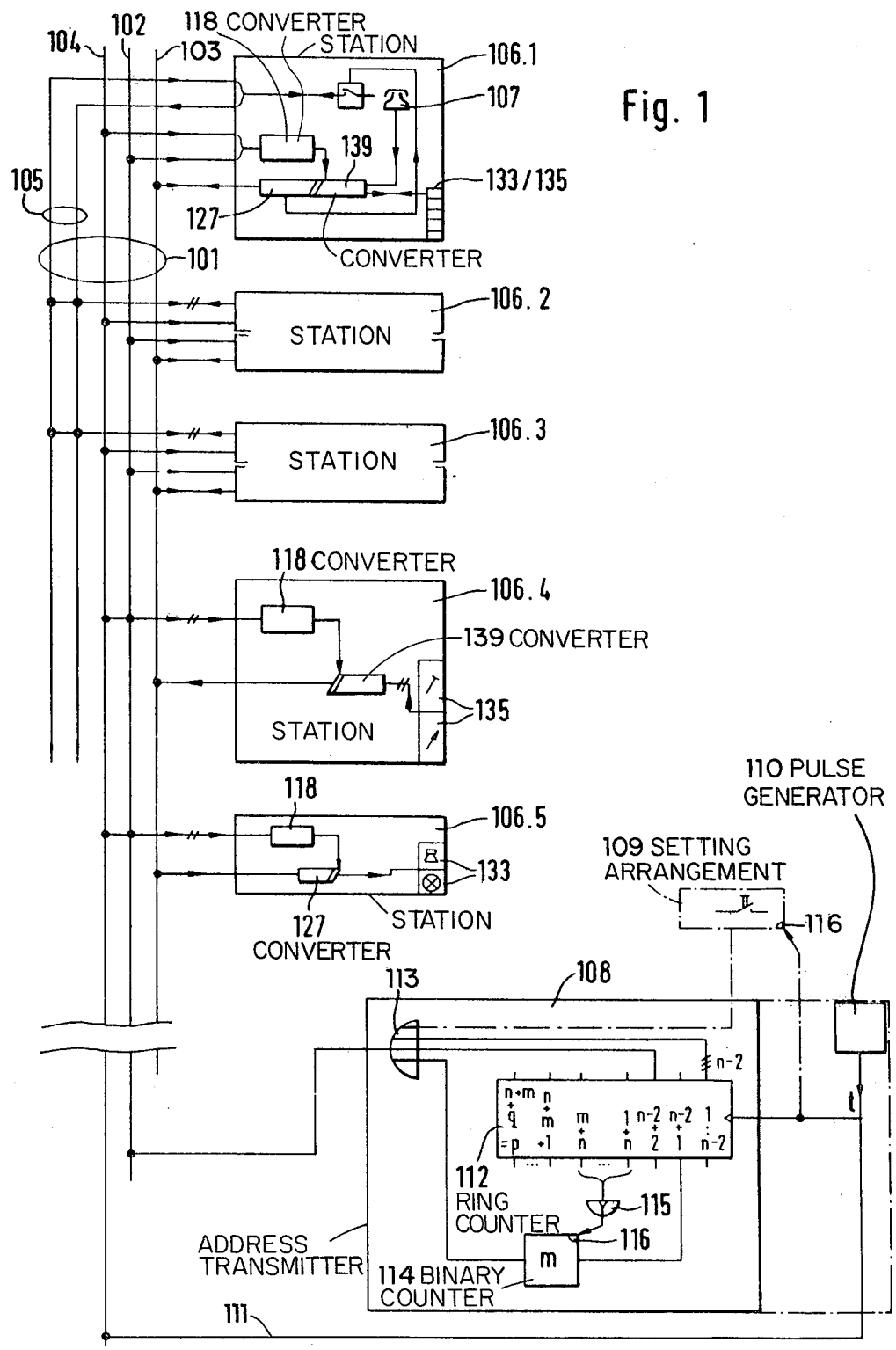
FIG. 1 illustrates in principle the representation of a busy system pursuant to the invention for a preferred case of utilization, in essence, the control of speaker locations besides the transmission of further control and answer-back informations, with the additional consideration of a central address transmitter and, possibly, a pulse generator station.

The basic representation pursuant to FIG. 1 illustrates a bus system 101 which basically includes two bus conductors, in essence, an address conductor 102 and a status conductor 103. Moreover, as is already considered in FIG. 1, a timing or synchronizing conductor 104 may be provided as a further bus conductor. For the instance in which speaker locations 107, for example, or alternative speaker installations, are to be controlled through the bus system 101, there is provided at least a single-cable, preferably (as considered in FIG. 1) a dual-cable speaker conductor 105. In the practical realization there is, as a rule, provided for the bus system 101 also a single-pole or a two-pole power supply conductor (not shown in FIG. 1).

Connected to the bus system 101 is a plurality of mutually parallel stations 106, of which the three upper represented stations 106.1, 106.2 and 106.3 are equipped with speaker locations 107, as well as also being connected to the speaker conductor 105. Concurrently they can receive through the status conductor 103 serially transmitted, binary coded information, or transmit to other selected stations 106. Counted with such informations there may especially be the message as from which of the speaker locations 107 there emanates a call and to which of the further speaker locations (individually or a concurrent plurality) this call is directed, as well as which of the further speaker locations 107 is prepared for broadcasting, in effect, for instance, through the removal of the hand apparatus there is transmitted back a receiving information (station recognition).

With the station 106.4 there is illustrated in FIG. 1 such a station symbolically simplified which is merely designed to transmit informations to predetermined addresses, thus, for example, to the passive station 106.5, without itself being able to receive in return any answer-backs or other informations. The passive station 106.5, in contrast therewith, is illustrated in the example in FIG. 1 as being equipped only for the receipt of informations through the status conductor 103 without itself being able to transmit receiving information or other informations to other of the stations 106.

Further connected to the bus system 101 is an address transmitter 108 which supplies into the address conductor 102 mutually spaced, serially binary coded address informations for the control of predetermined stations 106 which are connected to the bus system 101. Basically there can be provided, as is shown in principle in FIG. 1 through a manually actuatable setting arrangement 109, the sequence of interesting address informations to be externally predetermined and sequentially supplied into the address conductor 102 with the replacement of the address information currently present in the conductor. In the interest of a good utilization of the bus system 101 and a high degree of flexibility with respect to the applicability of stations 106 it is as a rule, however, suitable to allow the entire spectrum of possible address informations to automatically, cyclically pass through in sequence, as is similarly considered in FIG. 1.

For the address formation there is provided a pulse generator 110 which is a component of the address transmitter or can be separately connected to the pulse conduit 104 of the bus system 101. In the exemplary case pursuant to FIG. 1 there is considered a pulse-coupling conductor 111 between pulse generator 110 introduced into the address transmitter and the pulse conductor 104 which is in this instance additionally provided with the address and status conductors 102 and 103 within the bus system 101, so that in the individual stations 106 there will not be required any individual (but concurrently running) pulse transmitters for the digital signal processing, whereas the synchronization for all stations 106 is carried out in parallel from the pulse conductor 104.

Figure 2:
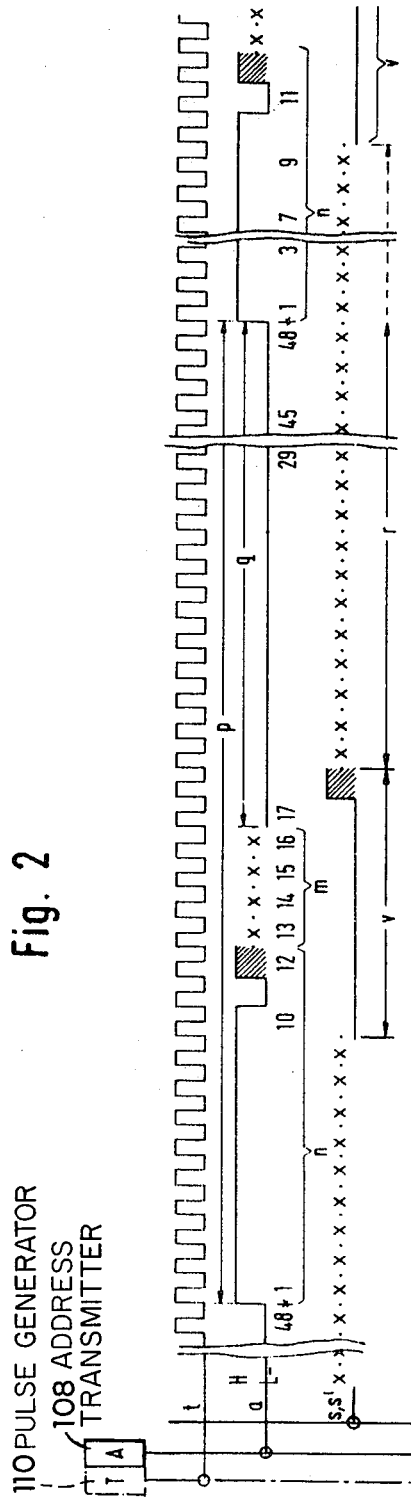
FIG. 2 is a bit pattern illustration on bus circuits pursuant to FIG. 1.

While this solution is, however, not absolutely required, in the bus system pursuant to FIG. 2 the pulse conductor 104 is illustrated only in phantom lines; it can be eliminated when the stations 106 are equipped, for example, with their own, based on high frequency stability, sufficiently synchronously operating pulse generators 110'.

The address conductor 102 conducts cycles of bits, in the illustrated preferred realized instance 48, in a repeating sequence variable address informations (a). Within each cycle there appears the actual address information (a) in m-position, for example, herein as a four-position binary coded number in the 13th to the 16th bit. Preceding this address information (a) is a readiness-bit pattern n which evidences a constant level above n-2 bits, followed by a level change above two further bits. The constant level preferably consists of high potential (H); whereby in the interest of the freedom from interference and system flexibility only H-levels are evaluated as bit informations. For the remainder of the cycle p, for the remaining q bits, extending between the end of the address information (a) of the momentary cycle p and the beginning of the subsequent readiness-bit pattern n, the level in the address conductor 102 is held to the low-potential (L).

An address cycle thus consist of p-cycle bits which joins into a sequence of bits patterns with n readiness bits, m address bits, and a remaining vest of q-waiting bits.

At the suitable time point betwen two sequentially following address-bit patterns m into sequentially following address cycles, there can be changed the address information (a), particularly through binary coded further counting with a counter unit in the address transmitter 108.

This can in principle, as is illustrated in the lower portion of FIG. 1, consist essentially of a ring counter 112 which includes so many discrete interrogatable pulse positions as are provided in an address-cycle cycle-bits p. The further scanning of the ring counter 112 is carried out with the synchronizing pulses t from the output of the pulse generator 110. The ring counter outputs correspond to those bit positions of the address cycle p which, in effect, during the course of the readiness-bit pattern (n), should constantly evidence an H-potential, are connected through an OR-gate 113 to the address conductor 102. Those bit positions of the address cycle which should constantly evidence an L-potential (thus, in the case of the illustration in FIG. 2 the 11th bit and the 17th through the 48th bit of an address cycle p) are interrogated at the output end of the ring counter 112 by not supplying a signal into the address conductor 102. Connected to the counting input of a serially selectable m-positioned binary counter 114 should be one of the outputs of the ring counter 112 which preceeds the address bits m, illustrated in FIGS. 1 and 2 as the 11th output. When, during the course of the actuation of the ring counter 112, there here occurs a passing H-potential, the further counting in the counter 114 which is to be binary coded is interrogated by one count step. Advantageous hereby is just the utilization of the 11th ring counter output since this is not connected to the address conductor 102 of the bus system 101, in effect none of the interference pulses which can occur in the bus system 101 can exert an influence on the binary counter 114; and since up to the start of the serialized selection of the count position with the 13th bit of the address cycle there is still provided a rest interval of a one bit duration, so that no oscillation sequences can disruptively exert themselves, but with assuredness there is processed the new, stationary count position of the binary counter 114. For the selection of the new m-bit count position information, the outputs of the ring counter 112 corresponding to the m address bits are connected through a dynamnic OR-gate 115 to the read-out synchronizing input 116 of the binary counter 114, so that the binary coded count position is supplied serially through the OR-gate 113 into the address conduit 102, which thereafter, commencing from the 17th of the address cycle, remains maintained through the wait-time span from q-wait bits at the L-potential, in that there follows no further control of the OR-gate 113 for the remainder of the passing through of the ring counter 112.

Predetermined ones of the stations 106 which are connected to the bus system 101 can have specific address information (a), in the form of a different binary coded count information pursuant to the pattern of the m address bits, associated therewith. Stations which, for example, for a one-sided, alternating or a conference speaker connection, or for special data transmission, are to be in connection with each other, have the same binary coded count condition of the address transmitter 108 associated therewith; a participator recognition report can be effected, for example, through specifically associated positions, in the status-bit pattern r. Collective stations 106 are constantly prepared for the receipt of the sequential address informations (a) present on the address conduit 102. In each station 106 (of which in FIG. 3 there is illustrated only one operating actively as well as passively but is not equipped with a speaker location) an address decoder 117 is connected to the output of a series-parallel converter 118 which is connected to the address conduit 102. This is further connected to the pulse conduit 14 (when the station 106 is not equipped with its own pulse generator 110', but which must be maintained through a synchronization device 119 in synchronism with the synchronizing pulses t, which control the digital information processing in the concurrently operating stations 106).

Figure 3:
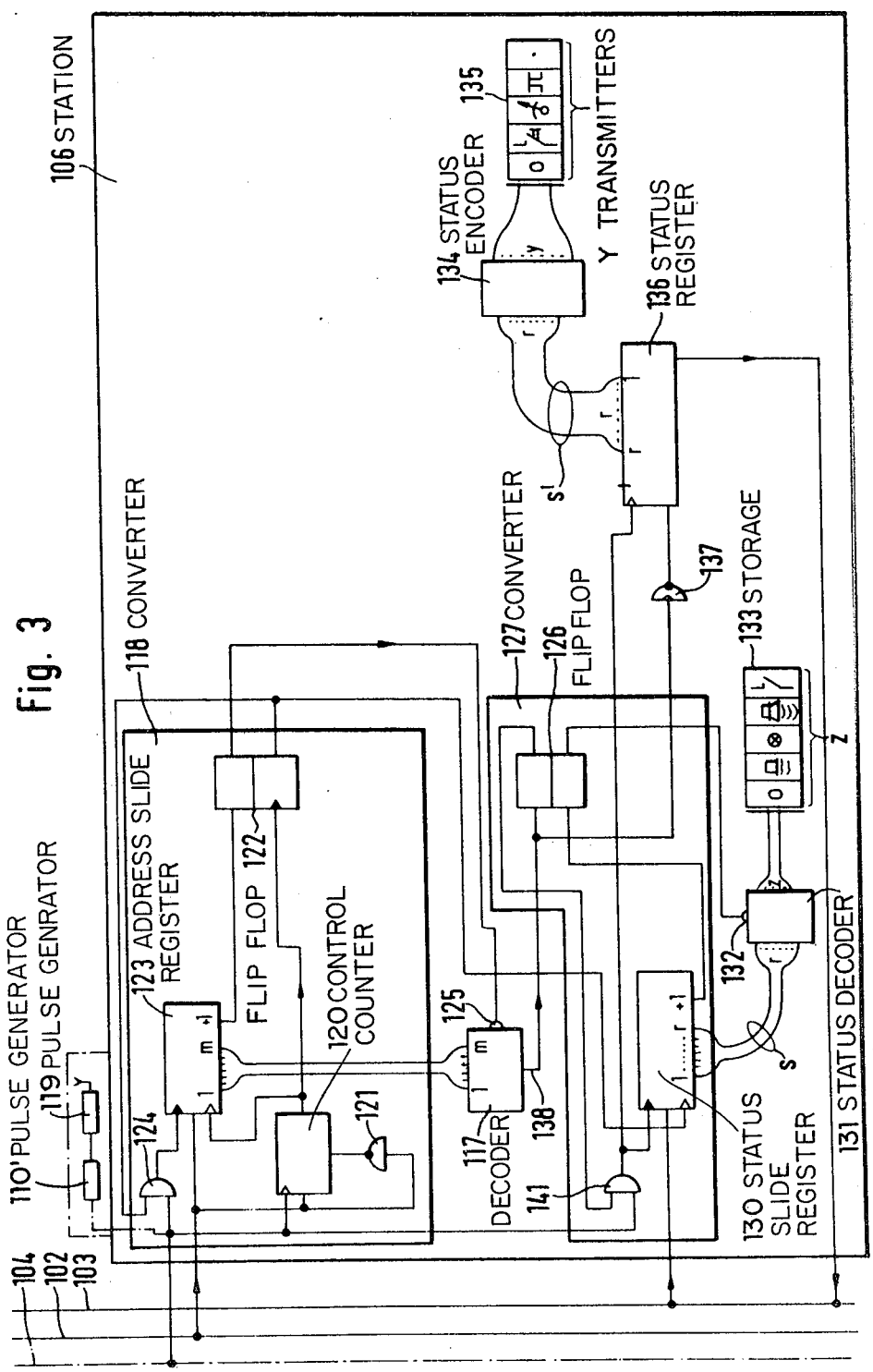
FIG. 3 is a schematic exemplary circuit for the decoding and encoding sequences during the address-controlled decoding of the status-bit patterns.

The real address information (a) which is to be evaluated extends over m sequential bits in the wake of the cycle bits p. In the wake of a preparation bit pattern n there appear prior to the occurence of the m address bits directly sequentially following more bits with H-potential, since otherwise, and in particular as binary coded address count positions, will always occur in the address cycle p, followed by a bit pair with potential change LOW (L)-HIGH (H). For this there can be selected the number (n-2) of the H-bits equal to m, with the suppression of the last count position before the jump back of the binary counter 114; or the bit number (n-2) is selected to be larger than m; as is illustrated in FIGS. 2 and 3 as being preferred.

Within the series-parallel converter 118 (refer to FIG. 3) the H-bits which enter from the address conduit 102 are counted in a control counter 120, which is set back to its initial count position through an inverter stage 121 as soon as in the sequence of the bit positions there no longer is present an H-potential in the address conductor 102. Only once the count position >m has been reached, does the control counter 120 emit an output signal in order to set a bistable flip flop 122, and to set an address slide register 123 into a definite output condition. On the address conductor 102 there follows the bit with L-potential (in FIG. 2:11th), which has as a result the resetting of the control counter 120 which is no longer required in this address cycle. Thereafter the last (12th) bit of the readiness-bit pattern n evidencing the H potential and which emanates from the address conductor 102 is introduced into the address slide register 123 since an AND-gate 124 located ahead of the synchronizing input is held opened by the set bistable flip flop 122, followed by the m-positioned bit pattern of the count or, in effect, address information (a). The address slide register 123 of the series-parallel converter 118 for the address decoding evidences m+1 positions. At the last output there thus appears the H signal for the resetting of the bistable flip flop 122 when the entire m-positioned binary coded address information a is assumed in the further positions of this address slide register 123. As a result, the AND gate 124 is then blocked, in effect, for the remainder of the address cycle pursuant to the q waiting bits there is no longer any influence over the output information of the address slide register 123. Concurrently, from the reset bistable flip flop 122 there is now released the enable input 125 of the address decoder 117, wherein this relates to a coincidence circuit, occasionally inverting individual bit positions, which only emits an output signal during the address bit pattern m which corresponds to the address of just these stations 106, in order to set an information flip flop 126.

Then, after transmission of the momentary address information (a) over the address conductor 102 of the bus system 101, there follows on this status conductor 103 the status information s or s'. In the interest of address decoding which is free of interference, as may be ascertained in the upper portion of FIG. 2, in every case during the change in potential of the two last readiness-bits (Numbers 11 and 12 in the bit pattern n), and in particularly during the m address bits, the status conductor 103 is held at the L-potential so that through these there cannot be effected a capacitive interference coupling during the address decoding. Suitably, under circumstances, there follows on the address bits m a still further bit with L potential on the status conductor 103 so as to ensure prior to the commencement of the decoding that the herewith transmitted status information s stationary conditions, in particular with respect to the switching sequences from the address decoder 117 is assured through the information flip flop 126; however, this additional requirement for a blank bit is in any case not necessary when the successful address decoding automatically starts the status decoding. In either case of the preferred exemplary embodiment illustrated in FIG. 2 for the represented cycle scope of p=48 bits there thus follows on the status conductor 103, as the termination of the L readiness bit pattern v, a status lead bit which (comparable to the address lead bit) evidences a constant H-potential, and this is followed from the 19th bit to the actual status information s, which can in all instances extend up to the end of the cyle (48th bit); at a greater information need an extension is permissible up into the preparation bit pattern n of the subsequently following address cycle, since this will commence through the n-2 bits with the duration H potential (which due to the not occuring potential change is also relatively secure against interference).

For the initiation of the decoding sequence (in effect, the series-parallel conversion of the status information s) there is set back a status slide register 130, for example, during the L potential conducting readiness-bit pattern v during the setting of the flip flop 122. An AND gate 141 is released from the set information flip flop 126 for synchronizing pulse t so that the status slide register 130 assumes the bit sequence entering the status conductor 103. The first usable signal conducting bit on the status conductor 103 is the lead bit, since it constantly carries an H-potential. For the control of the series-parallel conversion with decoding of the status information s there are interrogated those of the outputs of the status slide register 130 for the resetting of the information flip flop 126, which corresponds to the preset r bit scope of the status information s. Within the scope r (possibly +n-2) the status information which is to be decoded can also be suitably short; the decoding is constantly introduced automatically controlled as soon as the lead H bit has traversed the slide register 130 designed for the status scope specific to the stations, the status series-parallel conversion being thus shut down. When, in essence, the first information with H-potential, effectively the lead bit reaches the last output (for example r+1=49th bit for the address cycle pursuant to FIG. 2), then the entire serially interrogated status information s from the status conductor 103 is contained in the status slide register 130 and it can be interrogated in parallel at these outputs l-r by the status decoder 131, which is released through its enable input 132 from the reset information flip flop 126.

Similar to the address decoder 117, the status decoder 131 also operates essentially as a coincidence circuit, however, with a plurality of output informations which are associated with different portions of the bit pattern of the status information s. In contrast therewith there can be triggered 2 control or circuit functions from the status decoder 131, for example, there are triggered different optical and/or acoustic signal transmissions and switching functions in a storage 133. Concerning the switching function this relates, for example, to the switching sequence of a speaker location 107 to the speaker conductor 105 in the instance of a station 106.1 to 106.3 pursuant to FIG. 1, and in the optical and/or acoustic signal transmissions this can relate to call signals of different priorities which are triggered from a speaker location 107 at those others, which are present in stations 106 with the same address, which also concurrently controlled from the address information (a) present in the address conductor 102 and are thereby switched in parallel.

In order to initiate such a call (for instance an answer-back signal targeted to be transmitted back or at all stations 106 of the same address to transmit, after a hand apparatus is removed, an individualizing occupied signal) in the respective stations 106 there is also provided a status encoder 134. Its function corresponds to the setting device 109 in a case of the external, targeted settable address transmitter 108 (FIG. 1); in essence, a number of y transmitters 135 (such as manually actuatable switches and/or relay transmitters or data receivers), are switched through a network and, as required, a preconnected binary coder in the status encoder 134, in parallel to the r setting inputs of a status register 136. This was previously erased by the output signal of the address decoder 117 of this station 106 through a dynamic inverter 137. The status information s' impressed thereover over the setting inputs are controlled through the synchronizing pulses t at a reset bistable flip flop 122, (refer hereinabove), serially retrieved, in effect, transmitted through the status conductor 103 to all stations 106 which, for example, due to the coinciding addressing, are prepared for decoding for an incident status information s'. Belonging thereto is also the status decoder 131 of the own station 106 so that, at a corresponding coupling thereto, by means of the storage 133 there is possible a read-after-write control status information s' introduced for bus transmission.

Purposefully, the status decoders 131 operate at a time delay relative to the status encoders 134, so that no possible spurious information can be obtained through switching periods and in particular through running periods (impulse side rounding off), but only bit levels will be evaluated in an at least approximately steady-state condition. This facilitates that, upon the connection of the status decoder 131 to the status conductor 103, low-pass filter elements be provided in a manner known therefor for the filtering out of the interference signals which are extremely short in comparison with the usable pulses, and thereby the freedom from interference of the bus system 101 is, in general, enhanced more significantly.

A definite offset in the mode of operation of the status encoder 134 and the status decoder 131 relative to each other is particularly advantageous and can be realized without excessive requirements on the apparatus, in that for the frequency of the square-wave synchronizing pulses t there is selected double the bit sequence frequency. As is considered in FIG. 3 for the symbols for the dynamic control through the L-H pulse flanks or sides or H-L pulse flanks or sides in the status encoder 134 or the status decoder 131, resulting thereby is the serialized transmission of the status information s' to the status conductor 103 and thereby to the status decoders 131 the individual stations 106 presently during the transition between two sequentially following bits, namely at a rising side of a synchronizing pulse to while there is evaluated the status information s in the status decoders 131 which currently would be first assumed in the status slide register 130 at a downwardly sloping side of the synchronizing pulse t.

Figure 4:
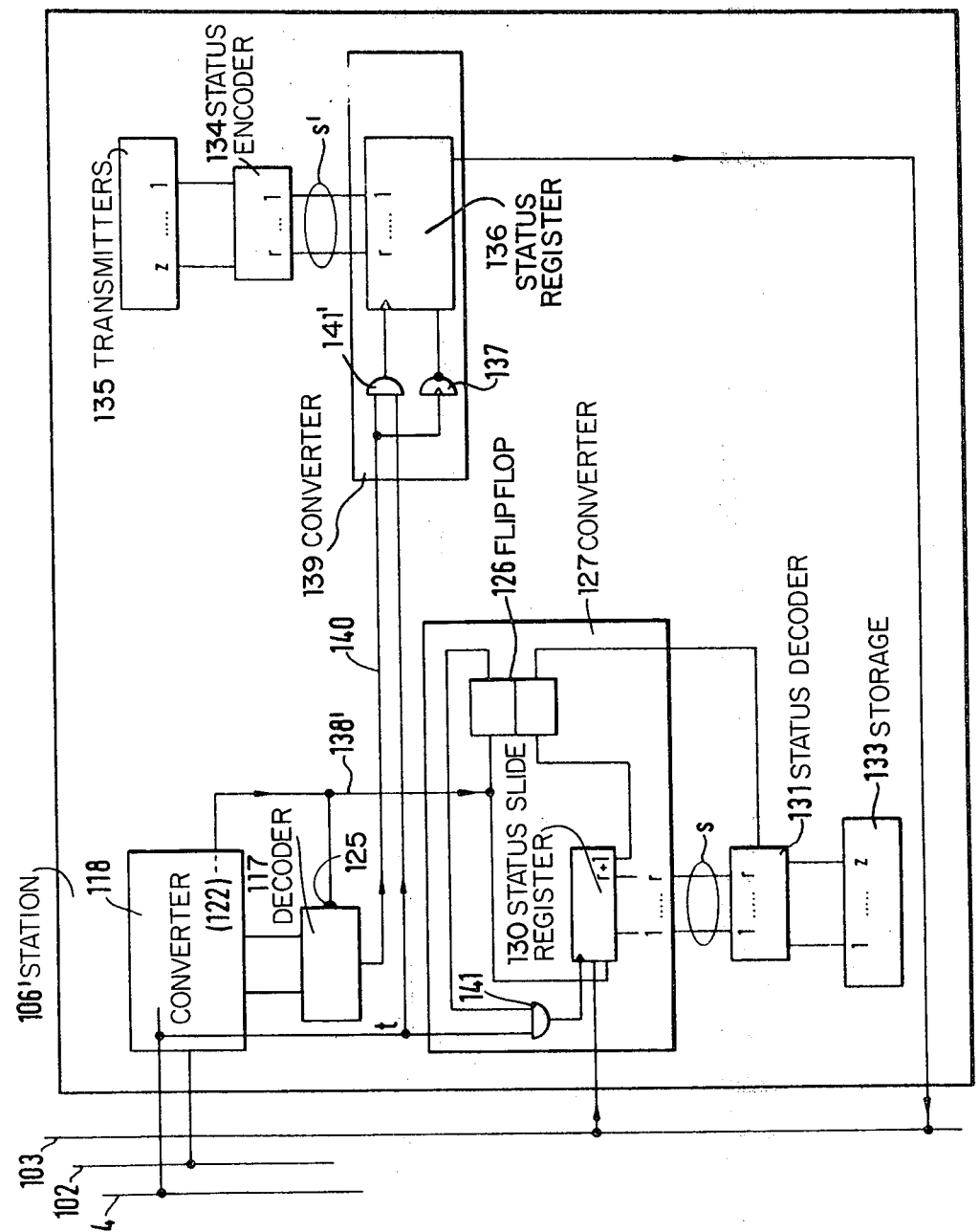
FIG. 4 is a modification of the exemplary circuit pursuant to FIG. 3 for the case of non-address controlled decoding of the status-bit patterns.

Particularly when the illustrated bus system 101 is designed for only a relatively limited number of different addresses (few address bits m) at a comparison therewith of a relatively quite large number of status bits r, as is considered in FIG. 2, it can be advantageous that within at least a few of the stations 106', in contrast with FIG. 3, there is undertaken the modification pursuant to FIG. 4. This evidences itself to be particularly purposeful in the preferred area of utilization of the inventive bus system 101, in essence, for the control of the communication connections between the speaker locations 107 on board of a commercial jumbo aircraft. In this instance, in all of the participating stations 106' coming into consideration, all status decoders 131 are constantly connected to the status conductor 103. This conforms also to the instance on the decoding side, since all stations 106' coming into consideration therefore are called with the same address, while their status decoders 131 (with series-parallel converters 127 connected ahead thereof) are constantly prepared for parallel receiving; thereby, however, with respect to the stations 106' taken into consideration for this mode of operation, there on the decoding side any addressing can be completely eliminated. Accordingly, in the station 106' pursuant to FIG. 4 (in contrast to the relationships existing in the station 106 in FIG. 3) the series-parallel converter 127 is activated through its decoding release conductor 138' (no longer from the address decoder 117, but constantly parallel to the address decoding) commencing somewhat with the action of the address lead bit for the setting of the bistable flip flop 122, independently of the actual address content.

In this instance, the address decoding is still utilized only for the control of the parallel-series converter 139 for the transmission of the status information s' from the status encoder 134 to the status conductor 103. For this purpose there is effected from the address decoder 117 through an encoding release conductor 140 the preparation of an AND gate 141', which is connected through periodically by the synchronizing pulses t so as to, on the basis of correspondingly designed dynamic inputs of the status register 136, each positive side, in effect at the start of each synchronizing pulse t, connect forward the serialized read out of the status register 136.

In the described preferred instance of utilization of the bus system 101 according to the present invention, and this specific inventive modification, this mode of operation corresponds somewhat to the call of the aircraft captain to a predetermined one of the speaker locations 107, with the result that collective speaker locations 107 connected thereto are switched through their status decoders 131 to the speaker conductor 105 in order to be able to passively partake in the speaker traffic, whereas only the speaker location 107 in the addressed station 106 reports back and status information s', by means of its status encoder 134 after removal of the hand apparatus, "occupied" information. This is present at an entirely predetermined location of the status bit pattern and is as such recognized by all other stations 106' which in the exemplary case pursuant to FIG. 4 are constantly prepared for decoding independently of address, due to the preset timewise association in the status bit pattern, and are indicated as occupied information relative to the addressed station speaker location 107 in the storage 133.

Figure 5:
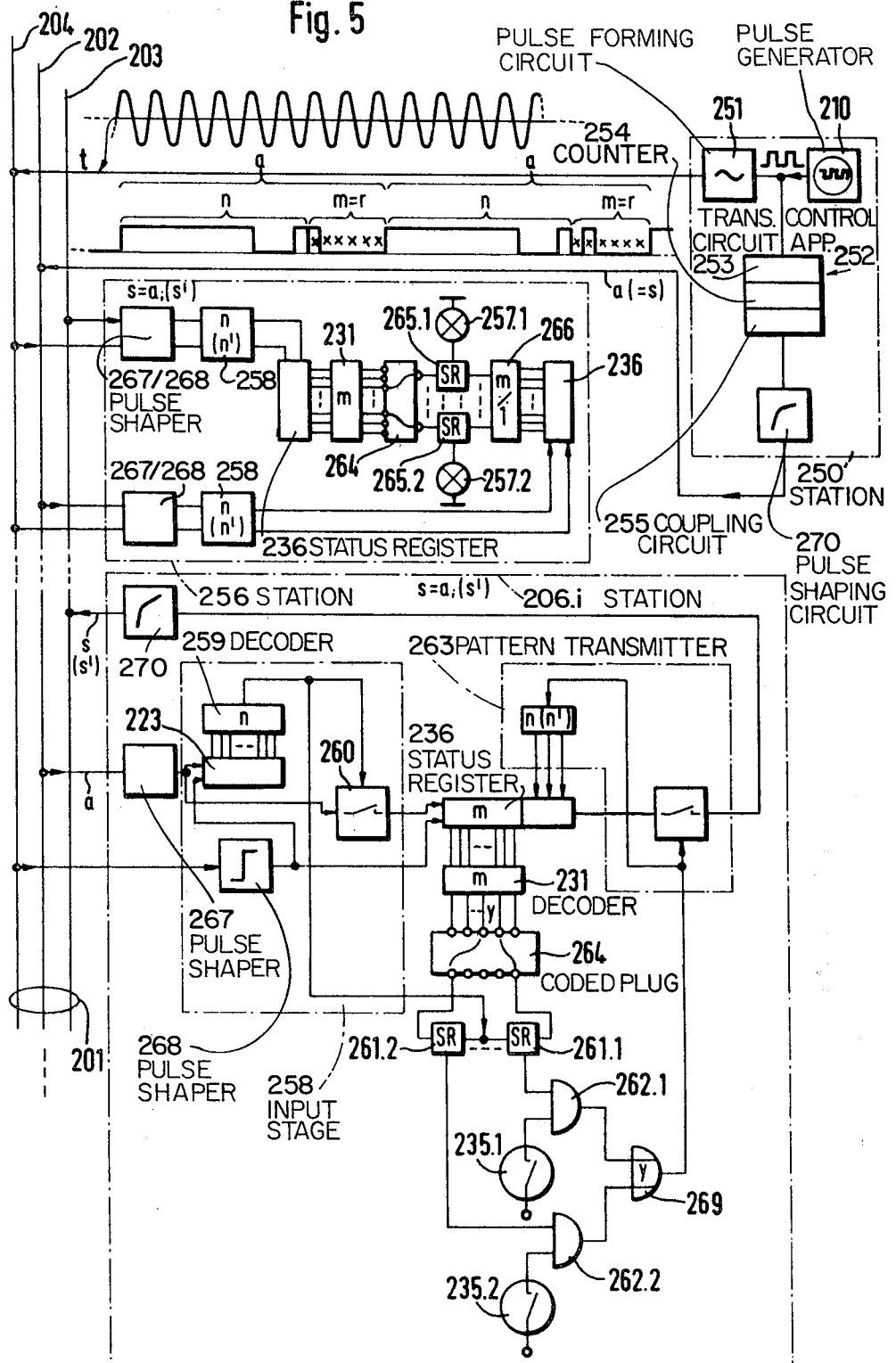
FIG. 5 is illustrative of the measures pursuant to FIG. 4 of a modified information representation of the bus circuits at an ideal pulse shape presentation.

In the instance of the example illustrated in FIG. 5, in the interest of increased freedom from interference for the synchronizing pulses t, which is carried by the synchronizing pulse conductor 204, present in lieu of square-wave pulses are only sinusoidal oscillations of, for example, 5 kHz. In an operating station 250, besides the pulse generator 210, there is thus contained a pulse forming circuit 251 which, for example, includes LC elements for the looping of the square-wave synchronizing pulses in a sinusoidal amplitude cycle. A control apparatus 252 essentially includes a transmitting circuit 253 for the generation of a definite, hereinbelow more closely elucidated, readiness bit pattern n, a binary counter 254 for the generation of a sequence of address bit patterns m and an output coupling circuit 255 for supplying the address conduit 202 with a continuous sequence of binary address informations (a). Downstream of the control apparatus 252 the operating station 250 incorporates a modified pulse shaping circuit 270 in order to round off the bit pattern n+m of the address information (a) for a reduction of the high-frequencied interfering radiations at the sides or flanks of the pulses (not considered in the drawing).

The address informations (a) which are present in sequence on the address conductor 202 consist of the constantly uniform readiness bit pattern n and its presently following bit pattern m, which evidence mutually following different values, represented in particular, preferably through the binary coded count sequence. For this purpose the address bit pattern m consists of m bits, in the illustrated instant example of m=6 bits for the sequentially following binary coded representation of the number 0 to 63. The section illustrated in the drawing of the address information (a) corresponds to the address count values "one" and "two".

The address information (a) is, however, not directly associated with predetermined stations 206.i, but particular predetermined status transmitters 235.y (which in turn are arranged in predetermined stations 206.i). This has as the result that through the address 202 there are not called up predetermined or subsequent collective stations 201.6, in order to encode their actual status informations pursuant to the station decoding; through the status conductor 203 to transmit to further stations 206 and/or to a central station 256 and to report there after decoding; contrarily all status informations which can at all occur in the system, are cyclically called up through the address conduit 202 independently in which station 206 with its status transmitter 235 is effected in that each status transmitter 235 is associated with one of the address informations a.

When, for example, in a station 206.i the cradle switch 235.1 is closed in its speaking position while the hand apparatus thereof is removed in order to be able to hold a conversation, then there is signaled through an associated signal transmitter 257.1 in the central station 256 and/or in other stations 206 connected to the bus system 201 and its speaker conduits, which in this regard are additionally equipped as is the central station 256; whereby from this signal transmission there can also be picked up control functions such as, for example, blocking or the switching in of further speaker locations, in accordance with the provided hierarchical system of the communications installation, or the otherwise serially ring-controlled installation through the bus system 201.

In all of the stations 206 connected to the address conductor 202 (and as required 256) there appears at the start of each of the sequentially following address informations (a) the fixedly preset readiness-bit pattern m which, after the recovery of square-wave pulses through a pulse shaper 267, is supplied into a slide register 223 for series-parallel conversion. The slide pulse is recovered from the pulse conductor 204, possibly through a pulse shaper 268 in which, for example, this can relate to a bipolar-controllable, potential-controlled flip flop.

In a simplified embodiment illustrated in the drawing for the input stage 258 the readiness decoder 259 which is connected to the output of the slide register 223, in which for example, to a coincidence grid programmed this relates to a readiness bit pattern n, then delivers, and only then, a readiness information when the start of the address information (a) is undisturbedly present in the form of this readiness bit pattern n. Through a coupling element 260 the subsequently following address bit pattern m, in effect, the binary coded number for the individualizing of a status transmitter 235, is read into a status register 236 for serial-parallel conversion, which has connected to the output thereof a status decoder 231 for the back coding of the binary coded number, by means of which, through the address conductor 202 there is individualized a predetermined one of the status transmitters 235.

The interrogation of the momentary status of the addressed status transmitter 235 is effected through a bistable switch element 261 with an AND element 262 connected to the output thereof which, at a HIGH condition of the addressed status transmitter 235, releases a status bit pattern transmitter 263 through an OR element 269 for the combining of the status informations delivered from the different status transmitters 235.y of a station 206. This passes onto the status conductor 203 of the bus system 201 a bit pattern r individualizing the addressed status transmitter 235. When this status transmitter 235 is activated (for example, the cradle switch due to the removed hand apparatus has a closed speaker location); whereby this bit pattern is preferably identical with the (address) bit pattern m, by means of which there is interrogated just this status transmitter 235. Preferably this status information (a) as well is also insofar identical with the address information (a) as pertains to each binary coded number relative to the readiness bit pattern m. For this purpose there is provided in the exemplary embodiment of the drawing that the status bit pattern transmitter 263 completes the actual content of the status register 236 by the readiness bit pattern n and the bit pattern n+r is thereby again read out serially; however, it can also be suitable to provide an intermediate storage of the address information (a) which is to be again emitted as the status information s so as to prevent through such uncoupling any spurious information due to grid running time phenomena.

The number of status transmitters 235 callable (interrogatable) by means of the binary coded numbers is, as a rule, much larger than the number of status transmitter 236 present within a station 206 (and possibly 256). In the interest of standardized manufacture, a switch circuit with which there is realized the presently described circuit of a station 206 with regard to its essential components (respectively 256), includes downstream of the status decoder 231 fewer bistable switch elements 261 (flip flops) than addressable status transmitter 235 due to the address bit pattern m. Through, for example, a coded plug 264 or a corresponding installation for a selection of predetermined conductor connections among a possible plurality of such, the flatwise in the circuit realized bistable switch elements 261 with their set inputs pursuant to the measure of the predeterminable utilization of the particular station, in effect, pursuant to the measure of the status transmitter 235 connected to these stations, are connected to the outputs of the status decoders 231.

In the illustrated exemplary embodiment there is provided that these bistable switch elements 261 are again set back with transition to the sequentially following address information (a), in effect, with the appearance of the subsequently following readiness signal at the output of the readiness decoder 259. When the status transmitter 255 remains further activated, then for a cyclically renewed appearance of the individualized bit pattern m there each time follows again concurrently the transitional setting of the switch element 261 from the associated output of the status decoder 231. In (other) stations 206 and, in particular, in a central station 256 for an activated status transmitter 235 there is again set in an associated status signal transmitter 257 through a bistable switch element 265, for example, again under association through a coded plus 264, and pursuant to the measure of the cycle of the address information a is set back in a cyclical manner.

Thereby there is again investigated the transmitted address information (a) as status information s according to pulse (side shapers 267 and 268), in an input stage 258 as to the undisturbed presence of the readiness bit pattern n so that, as described, after series-parallel conversion by means of a status register 236 and a status decoder 231 the status bit pattern r (=m) is to be decoded and to set the signal transmitter switch element 265 associated with the activated, momentarily interrogated status transmitter 235.

In order to achieve an at least quasi-continual signal transmission, this signal transmission-switch element 265 is not yet set back at the transition to the subsequently following address information (a), but only first after the passing of an address cycle and thereby, preferably immediately, prior to the subsequent call on the individual associated transmitter 235. For this, however, no cycle separating information is required but the resetting inputs of the switch element bank 265.7 are currently connected to that output of a resetting decoder 266 which carries a signal upon reaching of that number in the sequence of the address information (a) leads to a signal which lies ahead of the individualized number for the associated status transmitter 235. Upon reaching of this time point the associated status transmitter 235 be still further activated, then there appears immediately after the subsequently following, for this individual address information (a) the coinciding status information s, and the signal transmitter switch element 265 is again immediately set anew for the duration of an address cycle.

Pursuant to this further modification of the inventive bus system there are connected to the address and to the status conductors 202,203 unitary, thus inexpensively produceable circuit components for information decoding; whereby the demand for a station address decoding with subsequent status encoding can be completely eliminated in that, through the address conductor 202 there are not selected stations 206, 256 but cyclically all status transmitters 235 connected in suitable stations 206-256 are interrogated and in the activating case simply their address information (a) is reported further as status information s. This provides, in addition to savings in circuitry components, particularly also a reduced requirement in the search for errors since in the activating instance of status transmitters 235 in the described preferred embodiment there appears on the status conductor 203 the identical information, as shortly ahead on the address conductor 202. Preferably within the readiness gap. When there is provided that the status bit pattern transmitter 263 only emits the address status bit pattern m and in all instances prior thereto an extremely shortened readiness bit pattern n', in the interest of a further increased freedom from interference there is even ensured that the reporting back of the status information s' through the bus system 201 is carried out in timespan in which no change in level will occur on the address conductor 202 in the readiness bit pattern n.

In the interest of clarity all circuit measures are omitted in the basic drawings, which are usually employed in actual practice, so that notwithstanding different grid running time summation in parallel information processing courses there is assured a synchronized information processing, in particular such as through synchronized coupling and switch elements. Not considered are further possibilities for increasing the freedom from interference of the bus system 201 through the building in of answer-back circuits which provide interim storage for predetermined information and first become significant to further processing when they occur behind each other in larger numbers. During registering and decoding this relates to operational units which are commercially available in a standardized construction whereby, due to the comparable high freedom from interference, preferably component groups find application which can be attained in the CMOS technology.

What is claimed is:

1. In a bus system including an address conductor and a status conductor; mutually parallel stations having programmable address decoders, status decoders and status encoders connected to said conductors, said address conductor carrying a sequence of address informations and said status conductor carrying status informations timewise associated therewith; the improvement comprising: said address conductor carrying mutually spaced, serially binary coded bit patterns of, respectively, m-address bits; and said status conductor carrying a serialized bit pattern of r-status bits offset relative to the address bit pattern m.

2. Bus system as claimed in claim 1, wherein predetermined bits of said status bit pattern r are fixedly associated to predetermined status and/or address informations.

3. Bus system as claimed in claim 1 or 2, comprising a readiness bit pattern n ahead of said address bit pattern m; and a readiness bit pattern v ahead of said status bit pattern r whereby at predetermined stations there is initiated the detection of the readiness bit pattern v from the readiness bit pattern n.

4. Bus system as claimed in claim 3, wherein in said predetermined stations there is initiated the reading in of parallel-series converted status informations from an encoder into the status conductor from an address decoder.

5. Bus system as claimed in claim 1, comprising a fixedly preset readiness bit pattern n ahead of the address bit pattern m.

6. Bus system as claimed in claim 1, comprising a waiting bit pattern a in the form of a constant L-potential given on the address conductor between the end of an address bit pattern m and the start of the following readiness bit pattern n.

7. Bus system as claimed in claim 1, comprising a series-parallel conversion for the decoding of the address information (a) and the status information s, which is automatically controlled through a lead bit directly ahead of the address bit pattern m or the status bit pattern r.

8. Bus system as claimed in claim 1, wherein said address conductor carries an address bit pattern related to the sequence of all possible status bit patterns v presently separated by a readiness bit pattern n, and said status conductor therefrom carries only those of the status bit pattern r which is connected from the status transmitter activated by its address decoding to the status conductor.

9. Bus system as claimed in claim 1 comprising a bistable switch element between a current status transmitter, as present in at least one of said parallel stations, and the output of the status decoder associated with said status transmitter, which is resettable from a readiness decoder connected to the address conductor.

10. Bus system as claimed in claim 1, comprising a bistable switch element between a current status signal transmitter, as present in at least one of said parallel stations, and the output of a status decoder associated with said status signal transmitter, which is resettable from a decoder supplied from the address conductor and interrogated by address bit pattern is not associated with this status signal transmitter.

11. Bus system as claimed in claim 1, comprising stations, speaker locations and signal storages forming a communication system for the crew of a commercial jumbo aircraft, and a status transmitter, as present in at least one of said parallel stations, comprises cradle switches and call buttons at speaker locations and storages.

* * * * *

UNITED STATES PATENT AND TRADEMARK OFFICE
CERTIFICATE OF CORRECTION

PATENT NO. : 4,426,697
DATED : January 17, 1984
INVENTOR(S) : Hans Peterson, et al.

It is certified that error appears in the above-identified patent and that said Letters Patent are hereby corrected as shown below:

Column 3, line 16, "busy" should be --bus--,

Column 6, line 10, "14" should be --104--,

Column 7, line 66, "1-r" should be --1--r--.

Signed and Sealed this

Twenty-ninth Day of May 1984

[SEAL]

Attest:

GERALD J. MOSSINGHOFF

Attesting Officer    Commissioner of Patents and Trademarks